United States Patent [19]

Eujita et al.

[11] 4,136,273
[45] Jan. 23, 1979

[54] METHOD AND APPARATUS FOR TIG WELDING

[75] Inventors: Haruo Eujita; Yasushi Ishikawa; Hiroshi Tachikawa; Taizo Nakamura, Sagamihara, all of Japan

[73] Assignee: Nippon Steel Corporation, Tokyo, Japan

[21] Appl. No.: 774,652

[22] Filed: Mar. 4, 1977

[51] Int. Cl.² .................. B23K 9/04; B23K 9/24
[52] U.S. Cl. .................. 219/121 P; 219/137.8; 219/76.16; 219/137.7; 219/75
[58] Field of Search ........... 219/130, 126, 76, 131 F, 219/75, 121 P, 137 R, 137.71, 137.7, 137.8

[56] References Cited

U.S. PATENT DOCUMENTS

| | | | |
|---|---|---|---|
| 2,241,563 | 5/1941 | Wall | 219/137 RX |
| 3,312,566 | 4/1967 | Winzeler et al. | 219/121 P X |
| 3,472,995 | 10/1969 | Browning et al. | 219/76 X |
| 3,549,857 | 12/1970 | Needham | 219/130 X |
| 3,767,890 | 10/1973 | Madden, Jr. | 219/137 R |
| 3,940,586 | 2/1976 | Stearns et al. | 219/136 |
| 3,956,610 | 5/1976 | Kurbe et al. | 219/131 F |
| 3,989,921 | 11/1976 | Ohi et al. | 219/131 F |
| 4,024,369 | 5/1977 | Thompson | 219/76 |

FOREIGN PATENT DOCUMENTS

| | | | |
|---|---|---|---|
| 154636 | 1/1954 | Australia | 219/137 R |
| 2424666 | 12/1974 | Fed. Rep. of Germany | 219/131 F |
| 2448620 | 7/1975 | Fed. Rep. of Germany | 219/121 P |
| 1425526 | 2/1976 | United Kingdom | 219/121 P |

*Primary Examiner*—J. V. Truhe
*Assistant Examiner*—M. Paschall
*Attorney, Agent, or Firm*—Wenderoth, Lind & Ponack

[57] ABSTRACT

A method for TIG welding by using a plurality of non-consumable electrodes extending from the tip of a TIG welding torch and one filler wire fed through a space between the electrodes, each electrode being independently supplied with power. A molten pool is formed by melting both the base metal to be welded and the filler wire by means of arcs generated between respective electrodes and the base metal. Melting of the base metal is mainly controlled by the arc produced by one of the plurality of electrodes while melting of the filler wire is mainly controlled by the arc generated by the other electrode.

7 Claims, 16 Drawing Figures

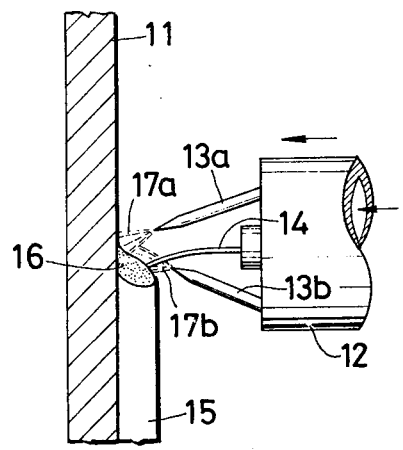
FIG. 1
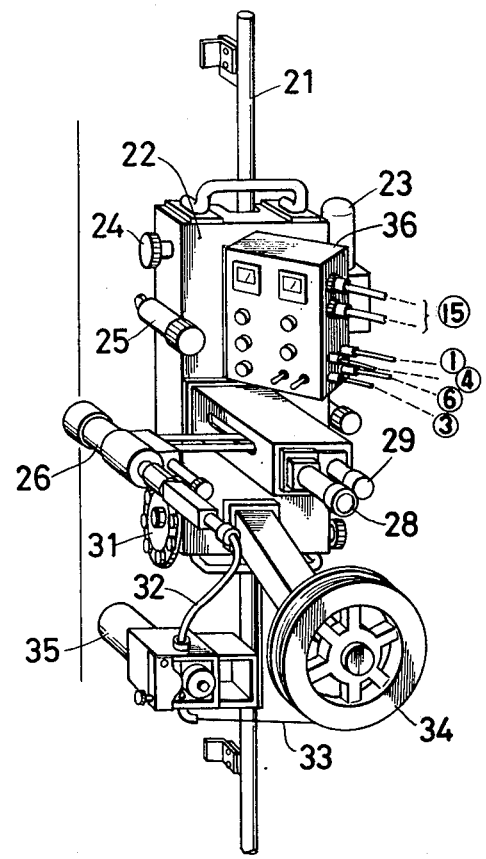
FIG. 2
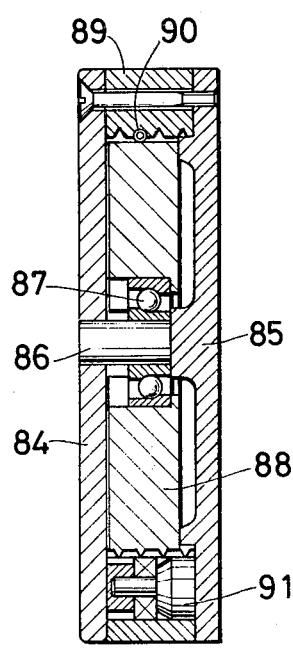
FIG. 4
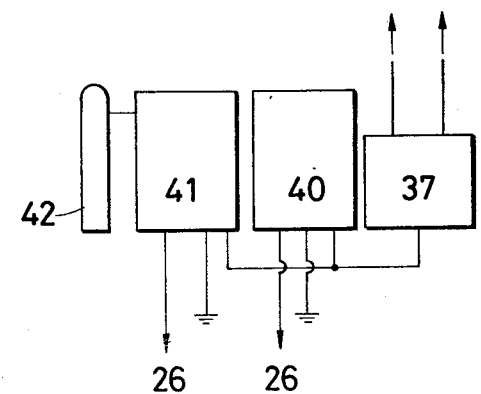

METHOD AND APPARATUS FOR TIG WELDING

BACKGROUND OF THE INVENTION

This invention relates to an improved method and apparatus for TIG welding, more particularly to a method and apparatus for TIG welding of base metals by using a plurality of electrodes.

Generally, in a TIG (Tungsten Inert Gas Arc) welding method a tungsten electrode is projected from the tip of a welding torch toward a weld zone of a base metal, and the welding torce ejects an inert gas such as argon or helium to form an inert gas shielding atmosphere in which an arc is produced between the electrode and the base metal, whereby weld penetration of the base metal is achieved and a filler wire is fed from the tip of the welding torch and melted. In the above described welding method, since both the base metal and filler wire are melted by the arc produced by only one tungsten electrode, if welding heat input to the weld zone is excessive, the temperature of the molten pool in the base metal generated by arc heat is excessively increased and the base metal around the molten pool is also melted, resulting in serious problems in that the molten pool is expanded and molten metal tends to run out of it. Those problems are particularly liable to occur in welding a vertically positioned base metal. On the other hand, if the welding heat input is insufficient, the temperature of the molten pool drops, resulting in defective welding due to incomplete weld penetration. Therefore, in the conventional TIG welding method, since only one electrode serves the two functions of melting the filler wire and performing weld penetration, in order to avoid running away of melted metal, it is necessary to conduct the two functions under optimum conditions at all times for achieving sound welds. However, since it is difficult to maintain the optimum welding conditions at all times, increase of welding efficiency cannot be achieved.

SUMMARY OF THE INVENTION

It is an object of the invention to provide a TIG welding method for achieving sound welding with a desired depth of penetration, and in which running away of the molten metal is eliminated.

It is another object of the invention to provide a TIG welding method having greatly increased welding efficiency compared with the conventional TIG welding method.

It is another object of the invention to provide a TIG welding method which make possible a smooth welding operation and which can properly control the depth of penetration and the temperature of the molten pool.

It is another object of the invention to provide a TIG welding apparatus which can carry out the above-described TIG welding in a smooth, stable manner.

The aforesaid objects of the invention can be achieved by the following TIG welding method. In this method for TIG welding a plurality of nonconsumable electrodes are placed in a protective atmosphere formed by inert shielding gas emitted from the head of a welding torch which can travel along a weld line of a base metal, and a filler wire is also fed into the protective atmosphere to perform welding of the base metal. The filler wire is passed through a space between the electrodes projecting from the head of the welding torch. A welding voltage and current are supplied to respective electrodes independently, and a single molten pool is produced by melting the base metal and filler wire with arcs generated between each electrode and the base metal. The weld penetration depth of the base metal is controlled chiefly with arc plasma from one of the plurality of nonconsumable electrodes and melting of the filler wire chiefly with arc plasma from the other remaining electrode.

BRIEF DESCRIPTION OF THE DRAWINGS

FIG. 1 is a schematic illustration of the head of a welding torch for explaining the principle of the TIG welding method of the present invention.

FIG. 2 is a perspective view of a welding apparatus for performing the welding method of the present invention.

FIG. 4 is a sectional view taken along a line A—A in FIG. 3.

DETAILED DESCRIPTION OF PREFERRED EMBODIMENTS

Figure 3:
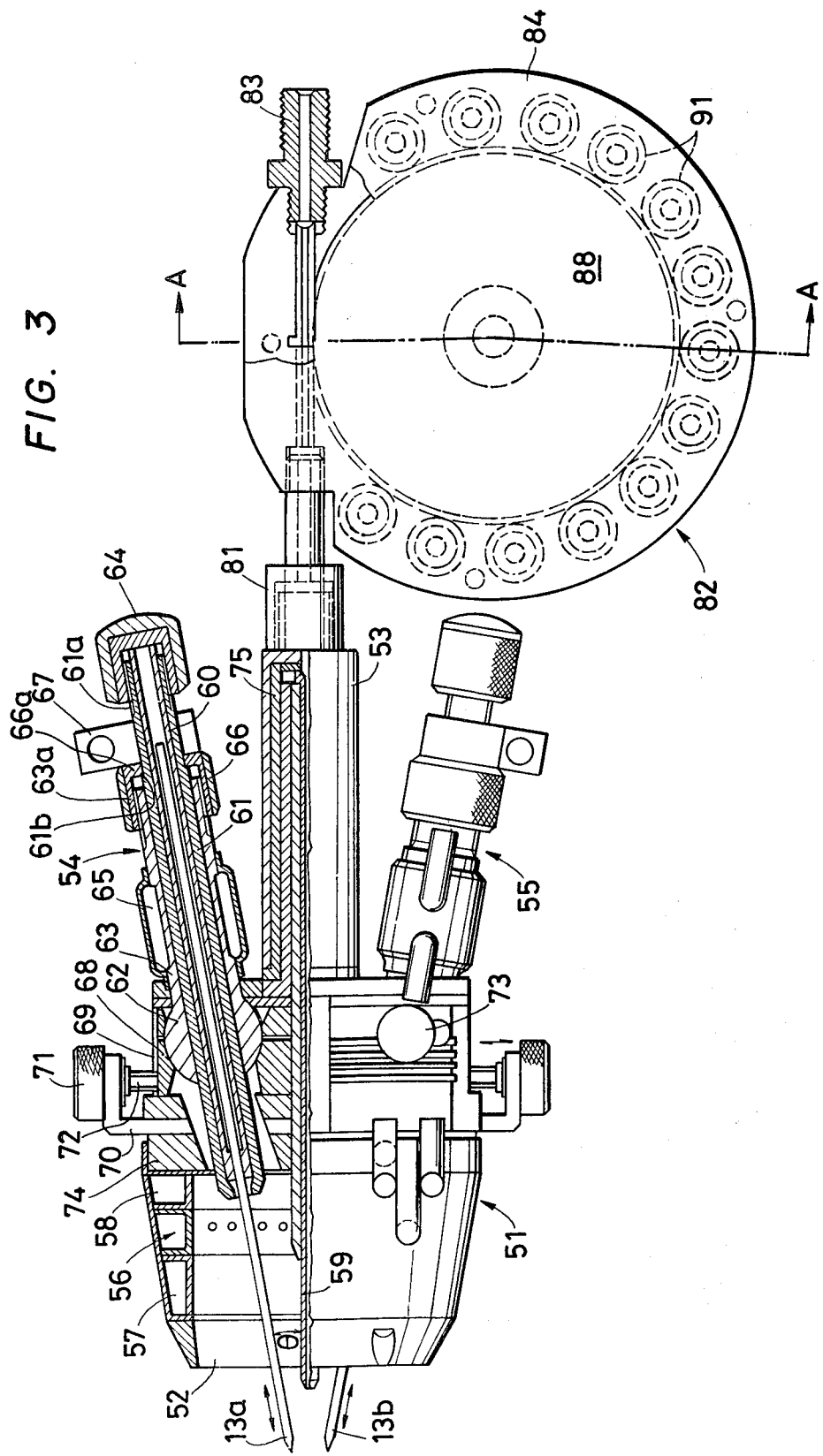
FIG. 3 is a side view, partly in cross section, of the details of the construction of a welding torch used for the present invention.

Referring to the drawings of the preferred embodiments, in the following detailed description of the present invention the welding method of the present invention will be described only in terms of vertical welding. Of course, it is apparent that the welding method of the present invention is applicable to welding at any other welding positions.

In FIG. 1 showing the principle of the welding method of the present invention, a welding torch 12 is provided which can move up and down at a fixed distance from an almost vertical weld line of the base metal 11. Two nonconsumable electrodes — for example, tungsten electrodes 13a and 13b, project from a head of the welding torch 12 toward the weld line, and one filler wire 14, located between the two electrodes 13a and 13b, is fed continuously. In addition, inert gas is discharged in the direction of the arrow from the periphery of the head of the welding torch 12.

The two electrodes 13a and 13b, and the filler wire 14 are positioned in a straight line in alignment with the weld line. Furthermore, the two electrodes 13a and 13b are respectively angled toward a center line of the welding torch 12, and more specifically the length of the upper electrode 13a is greater than that of the lower electrode 13b. The two electrodes 13a and 13b are electrically insulated from each other and each is connected to a separate DC power source (not shown) so that independent welding voltage and current are fed to each electrode.

In the present invention, TIG welding is carried out in an inert gas atmosphere, using arcs generated between the base metal 11 and the two nonconsumable electrodes 13a and 13b, and the filler wire 14 supplied through a space between the two electrodes 13a and 13b. The filler wire 14 is continuously fed by a filler wire supply device (not shown) to a molten pool 16 which is formed at the top of a solidified, deposited metal 15 which is produced during the progress of the welding along a weld line on the base metal 11. The arcs from the two electrodes 13a and 13b are positioned close to each other, but are directed to different points. That is, the arc 17a from the downwardly inclined electrode 13a slightly precedes the arc 17b from the upwardly inclined electrode 13b. However, it is required that the two arcs 17a and 17b from the two electrodes 13a and 13b be closely positioned to form the molten pool 16, avoiding excessive separation. More specifically, the electrodes 13a and electrode 13b are directed so that the arc 17a from the electrode 13a heats an area centered at the top edge of the molten pool 16, and the arc 17b from the electrode 13b heats an area centered at a contact point between the filler wire 14 and the molten pool 16 as shown in FIG. 1. To obtain high stability of the arc, it is desired to maintain the arc length in a constant length. Therefore, it is recommended to predetermine the lengths of the electrodes 13a and 13b projecting from the welding torch 12.

As explained above, when welding is carried out with the two nonconsumable electrodes 13a and 13b arranged in specific directions and positions, the arc 17a from the leading electrode 13a mainly regulates the depth of penetration of the base metal, and the arc 17b from the trailing electrode 13b mainly melts the filler wire 14. As a result, the desired depth of penetration can be obtained by controling the welding voltage and current supplied to the electrode 13a, while the filler wire 14 can be fully melted by controlling the welding voltage and current delivered to the electrode 13b independent of the depth of penetration. Moreover, when an increase in the volume of the melted filler wire 14 occurs, the molten pool 16 is cooled down, thereby preventing overheating thereof and running down of the weld puddle. Compared with the conventional TIG welding practice using only one electrode, the welding method of the present invention achieves higher welding efficiency because the electrode 13a serves exclusively and positively for obtaining the desired depth of penetration. Of course, since the two electrodes 13a and 13b are arranged close to each other, the arcs from both the electrodes mutually affect and upgrade the functions of the other.

FIG. 2 shows an embodiment of a welding apparatus for performing the TIG welding method of the present invention. As illustrated in FIG. 2, a straight rail 21 is provided on the base metal parallel with the weld line thereof. A carriage 22 is mounted on the straight rail 21 in such a manner as to travel freely thereon The mechanism for driving the carriage 22 consists of a travel motor 23 attached to the carriage 22 and a plurality of rollers (not shown) which are driven by the travel motor 23 and engaged with the rail 21. Furthermore, the rollers can be pressed against or spaced from the rail 21 by a control knob 24 which is located on the side of the carriage 22. A surface-tracing roller 25 is attached to the side of the carriage 22.

The carriage 22 is provided with the welding torch 26, a torch weaving device, a torch-positioning device, a control box, a filler-wire supply device and the like all of which are necessary for TIG welding. The welding torch, for example, has the two nonconsumable electrodes and the filler wire projecting from the tip thereof — that is, an inert gas ejection nozzle as shown in FIG. 1. The welding torch 26 is supported on side thereof by an output shaft 30 which is engaged with a weaving motor 28 and an arc voltage control motor 29 via a gear box 27. By means of these motors 28 and 29, the welding torch 26 is set correctly relative to the weld line at the start of welding and oscillated in directions normal to the weld line during welding. At the rear end of the welding torch 26 there is provided a filler-wire bending device 31 and a conduit cable 32 for feeding the filler wire. The filler wire 33, which is wound around a reel 34 attached to the carriage 22, is delivered into the conduit cable 32 via a filler-wire supply mechanism having a supply motor 35, is bent by the bending device 31 so that it is given a permanent set, and then projected and fed to the welding groove from the head of the torch 26 after passing therethrough. A control box 36 mounted on the carriage 22 is connected, via cables 38 and 39, to a control panel 37 which is located in a position remote from the carriage 22 and connected to DC power sources 40 and 41 both of which are also located in a position remote from the carriage and electrically connected to the two electrodes, respectively. The control box 36 is connected to respective motors via cables. The control panel 37 regulates the welding voltage and current delivered to the two electrodes to the optimum values. An inert gas cylinder 42 is connected to the welding torch 26 through a hose.

In the present invention wherein TIG welding is carried out using a plurality of nonconsumable electrodes and one filler wire both projecting from one welding torch, the lengths the plurality of electrodes project, the distance between the electrodes, and the angles of the electrodes need not be constant at all times. The above-mentioned factors regarding the electrodes must be determined in accordance with changes in the groove conditions in the base metal, welding positions, etc. In FIG. 3, there is shown an embodiment of the welding torch in which the lengths of the electrodes, the distance between the electrodes, and the direction of projection of the electrodes may be controlled during welding. A mechanism capable of arbitrarily changing the feeding position of the filler wire is also shown in FIG. 3. As shown in FIG. 3, a hollow welding torch body 51 is equipped with, at the tip or front end thereof, a circular or elliptical inert-gas ejection nozzle, and, at the rear end thereof, with a small-diameter filler wire guide cylinder 53 extending in the axial direction of the body as well as with two electrode holders 54 and 55 which are arranged almost symmetrically about the foregoing cylinder 53. The two electrode holders 54 and 55 are angled toward the front end of the torch body 51. Within the wall of the torch body 51 there is formed an inert-gas introduction chamber 56 which has, on the inside surface thereof, a number of openings from which inert gas is emitted. In addition, the inert-gas introduction chamber 56 has water-cooled jackets 57 and 58 on either side thereof, both of which can be omitted unless specially required. In the central portion of the filler-wire guide cylinder 53 there is supported a hollow filler-wire supply tip 59 which extends along the center line of the torch body 51, the tip thereof projecting slightly from the inert-gas ejection nozzle 52. The rear end the supply tip 59 is connected to the filler-wire supply mechanism and the filler-wire reel via a wire-bending device which will be described later.

The two electrode holders 54 and 55 hold the nonconsumable electrodes 13a and 13b therein, respectively. The following description is only of the electrode holder 54 which is shown in cross section because both the electrode holders 54 and 55 are identical in construction. The electrode holder 54 comprises a collet 60 which directly holds the electrode 13a, a collet body which supports the periphery of the collet 60, and an inner cylinder 63 which partially supports the outside periphery of the collet body 61 and has a spherical head 62 at front end thereof. The collet body 61 is positioned so that front end thereof is within the torch body 51 and rear end thereof projects from the torch body 51. Furthermore, the rear end of the collet body 61 is provided with an external threaded portion 61a on which a cap nut 64 is threaded. The rear end of the collet 60 further to the rear than the collet body 61, and is in contact with the inside surface of the cap nut 64. Moreover, the collet 60 and collet body 61 have inside diameters at the front end reduced. Accordingly, when the cap nut 64 is turned in a direction such that it moves to the left in FIG. 3, the collet is slightly contracted because it is shifted and the exterior is pressed by the inside surface of the reduced diameter front end of the collet body 61, so that the electrode 13a is grasped securely. The electrode 13a is securely fixed by the electrode holder 54.

The inner cylinder 63 which extends through and is shorter than the collet body 61 has the spherical head 62 at the front end thereof, an external water-cooled jacket 65 at the midpoint thereof, and an external threaded portion 63a at rear end thereof. The threaded portion 63a of the inner cylinder 63 has a nut 66 thereon through which the collet body 61 passes. Furthermore, the inner surface of the end wall 66a of the nut 66 at one end thereof is engaged with a stepped portion 61b provided on the collet body 61. The outside surface of the end wall 66a of nut 66 is in contact with an electric power terminal 67 attached to the collet body 61. The end wall 66a of the nut 66 is locked between the electric power terminal 67 and the stepped portion 61b. Accordingly, when the nut 66 is turned, the collet body 61 is moved back or forth because the inner cylinder 63 is securely fixed to the torch body 51. Thus the distance the electrode 13a projects from the torch body 51 can be adjusted. The spherical head 62 of the inner cylinder 63 is rotatably supported by a spherical bearing 68 which is provided inside the torch body 51 and is securely fixed to a sliding block 69 which is engaged with a feed screw 72 which has a knob 71 on the top thereof and is supported by a supporting arm 70. Accordingly, when the feed screw 72 is turned, the spherical bearing 68 fixed to the sliding block 69 and the electrode holder 54 including the spherical head 62 move angularly to the axis of the torch body 51, thus regulating the distance between the ends of the electrodes 13a and 13b. In addition the torch body 51 is provided with a screw 73 the front end of which engages the spherical head 62. By loosening the screw 73, the electrode holder 54 can be arbitrarily turned about the spherical bearing 68. As a result, the direction in which the electrode 13a projects be set properly. After the direction of the electrode 13a is determined, the electrode holder 54 is locked by tightening the screw 73. Moreover, in the torch body 51 and the filler wire guide cylinder 53, appropriate insulators 74 and 75 are provided one embodiment of a wire-bending device which gives a permanent curved set to the filler wire 14 will be described. As explained with reference to FIG. 1, the filler wire 14 is fed to the molten pool 16 and melted by the arc 17b from the lower electrode 13b. Therefore, it is required that the filler wire 14 is fed correctly to the molten pool 16 and positioned so that a length thereof exposed to a high temperature portion of the arc 17b from the electrode 13b is maximized. That is, if a significant length of the filler wire 14 is properly exposed to the arc 17b, the melting speed of the filler wire 15 is increased accordingly, which allows speeding-up of the feed of the filler wire. Thus improved welding efficiency can be achieved. To this end, it is actually most suitable that the filler wire 14 be fed from the supply tip to the molten pool 16 while describing a regularly curved path with the center of curvature being on the side toward electrode 13b. The wire-bending device is operated for supplying the filler wire 14 along the aforesaid curved path.

As illustrated in FIG. 3, the wire-bending device consists of a guide block 81 axially attached to the rear end of the filler-wire guide cylinder 53, a wire-bending member 82 and an introduction guide block 83. The guide block 81 and the introduction guide block 83 each have central bores through which the filler wire passes. The wire-bending member 82 arranged between the guide blocks 81 and 83 is used for giving a permenant curved set to the filler wire by spirally winding it one or two turns and then feeding it to the guide block 81, thus avoiding direct, straight delivery of the filler wire from the introduction guide block 83 to the filler wire guide cylinder 53 via the guide block 81. The wire-bending member 82, as shown in FIG. 3 and FIG. 4, has a construction in which two keeper plates 84 and 85, both having the same diameter, are securely fixed to a shaft 86 at both ends thereof, a disc plate 88 is rotatably mounted, between the two keeper plates 84 and 85, on the shaft 86 via a bearing 87, and an outer ring 89 is securely fixed to the outside peripheries of the two keeper plates 84 and 85 with screws or the like. A spiral groove 90 through which the filler wire passes is formed on the inside surface of the outer ring 89, and a number of rollers 91 are provided along the spiral groove 90 inside the outer ring 89, the rollers 91 being partially exposed to the groove 90. The spiral groove 90 consists of one or more turns. The rollers 91 facilitate passage of the filler wire because they serve as a sort of roller conveyer. Furthermore, the disc plate 88 can also be securely fixed to the shaft 86 instead of being rotatably mounted thereon as described above. The guide blocks 81 and 83 are threaded into the wire-bending device 82. This wire-bending device 82 can be freely rotated about a filler-wire supply line — that is, a line linking the two guide blocks 81 and 83 and locked at any arbitrary position.

As explained earlier, because the wire-bending device 82 can be freely rotated about the filler-wire supply line in a plane normal to the filler-wire supply line, the extreme tip end of the permanently curved filler wire can be arbitrarily angled in the left or right direction for achieving appropriate positioning.

In the above-described welding torch shown in FIG. 3, welding current is separately supplied to each of the electrodes 13a and 13b through the same path consisting of the electric power terminal 67, collet body 61 and collet 60, while the filler wire is fed from the reel, filler-wire supply mechanism and conduit shown only in FIG. 2 to the introduction guide block 83 of the wire-bending device 82 where the filler wire is bent to give it a permanently curved set, to the guide block 81 of the filler-wire guide cylinder 53 to the supply tip 59 and finally to the molten pool. In addition, the inert shielding gas is delivered from the introduction chamber 56 to the ejection nozzle 52 for directing it to the weld zone. The practical welding operation is similar to that already explained with reference to FIG. 1. Depending on the welding position and weld zone conditions, the angles of inclination of the electrode holders 54 and 55 — namely, the angles of the electrodes — as well as the lengths of the electrodes 13a and 13b can be adjusted appropriately.

In the present invention, the construction of the wire-bending device is not limited to that shown in FIG. 3 and FIG. 4. The wire-bending devices shown in FIG. 5 and FIG. 6 can also be used.

Figure 5:
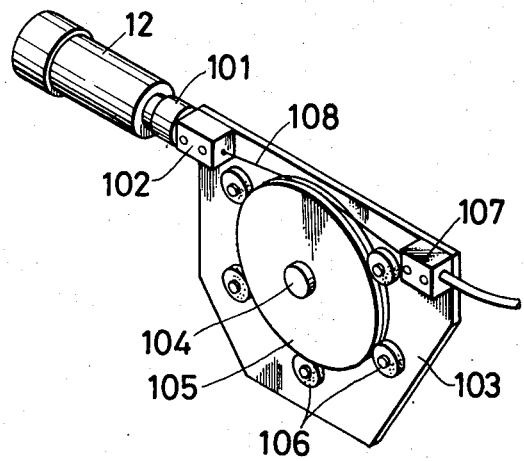
FIG. 5 and FIG. 6 are a perspective view and a side view of another embodiment of a wire-bending device of the present invention, respectively.

The wire-bending device shown in FIG. 5 comprises a joint 101, which allows rotation of the wire-bending device about the axis of the welding torch, securely coaxially connected with the welding torch at the rear thereof, a guide block 102 connected to the joint 101, a supporting plate 103 on which the guide block 102 is attached at one end of the upper edge thereof and a grooved wheel 105 rotatably mounted on a shaft 104. attached to a central point thereof, a plurality of keeper rollers 106 which are provided on the supporting plate 103 and arranged so that they are in contact with the outer periphery of the grooved wheel 105, and an introduction guide block 107 securely fixed to the other end of the upper edge of the supporting plate 103. In the foregoing wire-bending device, the filler wire 108 is wound around the grooved circumference of the grooved wheel 105 one turn after passing through the introduction guide block 107, and is then fed into the welding torch after passing through the guide block 102. As a result, the filler wire 108 is given the desired permanent curved set by wound around the grooved wheel 105, and the angle of projection of the end thereof can be adjusted by rotating the supporting plate 105.

Figure 6:
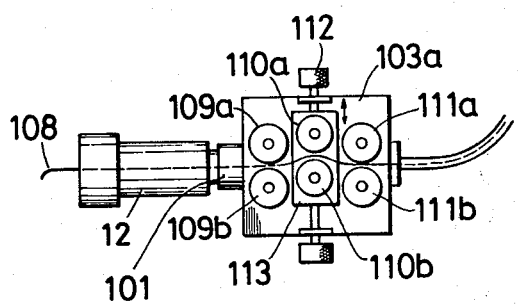

FIG. 6 shows a wire-bending device 103a in which three pairs of rollers, 109a and 109b, 110a and 110b, and 111a and 111b, are provided with the rollers in each pair being opposed to each other. The two end pairs of rollers, 109a and 109b, and 111a and 111b, are securely fixed to a supporting plate 113a, while the middle pair of rollers, 110a and 110b, are attached to an auxiliary plate 113 the vertical position of which can be adjusted by a screw 112. As shown in FIG. 6, when the auxiliary plate 113 is shifted upward by means of the screw 112, the path of the wire through the rollers 110a and 110b becomes higher than that between rollers 109a and 109b and 111a and 111b, whereby the filler wire 108 is bent upwardly so as to give it a permanent curved set.

Figure 7:
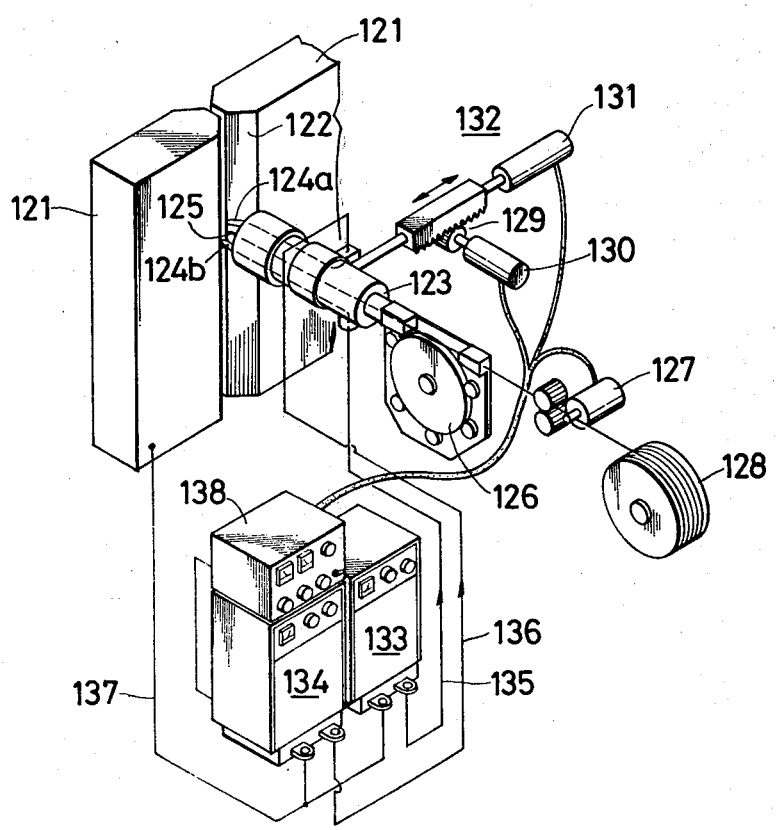
FIG. 7 is a schematic illustration of a welding current control mechanism of the present invention.

FIG. 7 shows an example of an apparatus for carrying out control of the welding conditions (welding voltage and current) in the welding method of the present invention using two nonconsumable electrode. The base metal is in two parts 121 separated by a groove 122. The welding torch 123 is provided with two nonconsumable electrodes 124a and 124b as well as one filler wire 125 located between the electrodes, and the electrodes and filler wire project from the head of the torch 123 toward the groove 122. A wire-bending device 126 is connected to the rear end of the welding torch 123, and a filler-wire supply mechanism 127 feeds the filler wire 125 to the wire-bending device 126. A reel 128 is provided on which the filler wire is wound. To the side of the welding torch is a torch-weaving mechanism 132 which is composed of a rack and pinion mechanism 129, a weaving motor 130 and a torch-position detector 131. Electric power is supplied from separately positioned welding power sources 133 and 134 to the two electrodes 124a and 124b via cables 135 and 136, respectively, and is fed back to the power sources 133 and 134 via a cable 137 connected to the base metal. These power sources 133 and 134 are wired to a controller 138 which controls the torch-weaving mechanism 132, the filler-wire supply mechanism 127 and the power sources 133 and 134.

In the control method using this apparatus, the groove 122 is welded by feeding the filler wire 125 from the head of the torch 123 to the groove 122 while giving the wire the permanent curved set, and the electrodes 124a and 124b are maintained in the desired projected position and spacing from each other, and electric power is supplied from the power sources 133 and 134. The details of the welding are similar to those described above with reference to FIG. 1. More important, each of the two electrodes 124a and 124b has a separate function — that is, the electrode 124a serves for melting the base metal (bead of the preceding layer in case of multilayer welding) to achieve the desired depth of penetration, while the electrode 124b serves for melting the filler wire 125 and heating up the molten pool. During welding, the welding torch 123 is reciprocated widthwise of the groove 122 by means of the torch-weaving mechanism 132.

Figure 8:
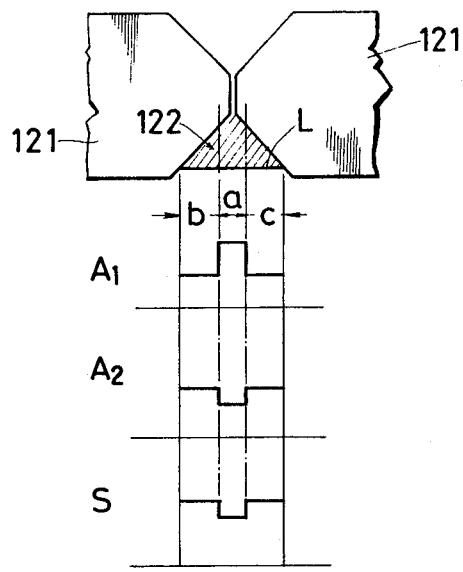
FIG. 8 is a diagram showing relationship between the variation of the welding current delivered to the two electrodes shown in FIG. 7 and the feeding speed of the filler wire.

To achieve a good welding result, it is desirable that the welding current and feeding speed of the filler wire be controlled in accordance with the diagram shown in FIG. 8. More specifically, in the diagram in FIG. 8, $A_1$ is a welding current delivered to the electrode 124i a and $A_2$ is the welding current to the electrode 124b, and welding is carried out in such a manner that the welding torch is weaved along a straight trace 'L' on one side of an X-shaped groove 122 in the base metal 121. In this case, the welding current $A_1$ fed to the electrode 124a, which serves for melting the base metal, is cyclically controlled in such a pattern that the $A_1$ value is large at the root portion 'a' of the groove and small on both sides 'b' and 'c', thereof while the welding current $A_2$ fed to the electrode 124b, which serves for melting the filler wire and heating up the molten pool, is controlled in a reverse pattern to that of the welding current $A_1$.

The controller 138 controls not only the weaving of the torch by means of torch-position signals transmitted from the position detector 131 provided in the weaving mechanism 132, but also the speed 'S' at which the filler wire 125 so that it is supplied in a pattern identical with that of the welding current A2. This is accomplished by regulating the motor of the filler wire supply mechanism 127. Generally speaking, it is difficult to weld groove roots and corners. To overcome this difficulty, the welding current A1 fed to the electrode 124a is increased at the aforesaid root and at the corners to achieve sufficient depth of penetration. In such a case, the welding current A2 fed to the electrode 124b is controlled in a pattern which is the reverse of the pattern of the current A1 to maintain the sum of the current A1 and A2 at a constant or slightly increased value, thereby avoiding excessive heat input to cause overheating of the molten pool and running away of the molten metal. Furthermore, when the depth of penetration is great, the molten base metal tends to flow into the molten pool, and the volume of accumulated molten metal becomes too large. However, when the supply speed "S" of the filler wire is reduced, the running away of the molten metal due to the excessive volume thereof can be avoided.

Figure 9:
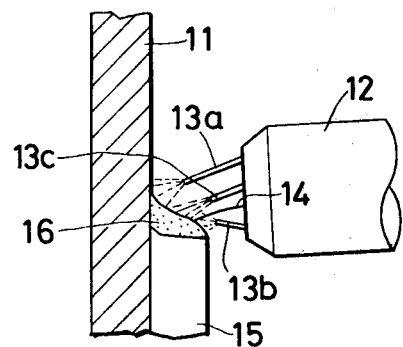
FIG. 9 is a schematic illustration of another embodiment of a welding method of the present invention.

FIG. 9 shows another embodiment of welding method of the present invention in which three nonconsumable electrodes are provided on one welding torch. In FIG. 9, 11 is the base metal, 12 is the welding torch, 13a, 13b and 13c are the three nonconsumable electrodes projecting from the head of the welding torch 12 toward a welding line, 14 is the filler wire which is positioned between the electrodes 13b and 13c and fed through the welding torch 12, 15 is the deposited metal, and 16 is the molten pool. The three electrodes 13a, 13b and 13c as well as the filler wire 14 are linearly positioned along the weld line. In this case, the upper electrode 13a chiefly serves for melting the base metal 11 to obtain the desired depth of penetration, while the electrodes 13b and 13c chiefly serve for melting the filler wire 14 and heating up the molten pool. The details of the welding in this embodiment is almost the same as those already described with reference to FIG. 1, and the description thereof is thus omitted. An advantage of the welding method illustrated in FIG. 9 is that the melting speed of the filler wire is improved as compared with the method shown in FIG. 1.

EXAMPLE 1

Figure 10:
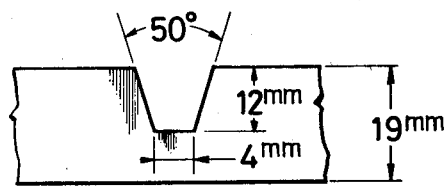
FIG. 10 and FIG. 11 are diagrammatic illustrations showing configurations and dimensions of grooves of the base metal employed in an embodiment of the present invention.

Vertical TIG welding is performed using a base metal of 9% nickel steel with a groove having a configuration and dimensions as shown in FIG. 10 by means of the welding apparatus shown in FIG. 2. The results are tabulated in Table-1. For convenience of comparison, using the same base metal, the results of welding by means of a conventional TIG welding apparatus employing only one electrode is also tabulated. The welding conditions of the method according to the present invention were as follows:

Table - 1

Figure 13:
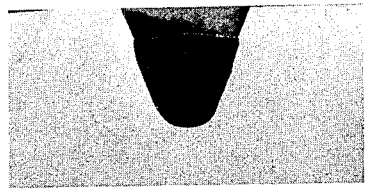
FIG. 13, FIG. 14, FIG. 15 and FIG. 16 are photographs showing macrostructures of weld beads prepared by an embodiment of the present invention and by a conventional welding method.
Figure 14:
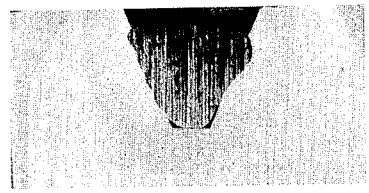
Figure 15:
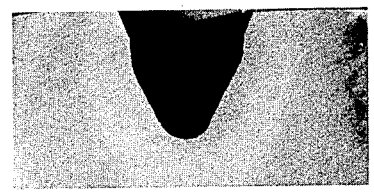
Figure 16:
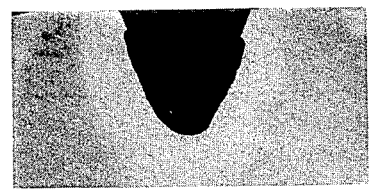

|  | Welding current (A) | Welding voltage (V) | Deposition rate (g/min) | Macrostructure photograph |
|---|---|---|---|---|
| Conventional welding method | 280 | 12 to 13 | 20 | Fig. 13 |
|  | 280 | 12 to 13 | 32 | Fig. 14 |
| Welding method of the present invention | 280 (13a=130) (13b=150) | 10 to 13 | 40 | Fig. 15 |
|  | 410 (13a=180) (13b=230) | 10 to 13 | 55 | Fig. 16 |

From Table-1, it is found that in the conventional welding method, the deposition rate of the filler wire was 32 g/min (maximum) at a welding current of 280A, but penetration and fusion into the base metal was incomplete, defective fusion thus taking place, as observed in FIG. 14. However, with a deposition rate of 20g/min, the fusion was sound and the bead was good as shown in FIG. 13. Further, when the welding current was 300A or more, the molten weld puddle run away and sound welding was impossible.

On the contrary, in the welding method of the present invention, when the total welding current to both electrodes was 280A, the deposition rate of the filler wire was 40 g/min (maximum), and the fusion was sound and the bead shape was good as shown in FIG. 15. Furthermore, even if the total welding current to the two electrodes was increased up to 410A, running away of the molten metal was not observed and good welding results were obtained as shown in FIG. 16.

EXAMPLE 2

Figure 11:
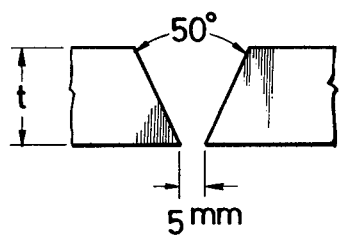

Table-2 shows the results obtained when a steel plate 14 mm thick was welded by the welding method of the present invention, and a steel plate 12.7 mm thick was welded by a conventional welding method. More specifically, welding was conducted in a V-shaped groove as shown in FIG. 11, from one side thereof, using a copper backing strip. In this case, the welding apparatus shown in FIG. 2 was utilized.

Table - 2

|  | Thickness t (mm) | Groove | Pass | Welding current (A) | Welding voltage (V) | Welding speed (cm/min) | Weaving frequency (Times/min) | Deposition rate (g/min) |
|---|---|---|---|---|---|---|---|---|
| Welding method of the present invention | 14 | Fig. 11 | 1 | 320 (13a=130) (13b=190) | 10 to 12 | 5.3 | 20 | 45 |
|  |  |  | 2 | 250 (13a=100) (13b=150) | 10 to 13 | 5.3 | 22 | 34 |
| Conventional welding method | 12.7 | Fig. 11 | 1 | 270 | 12 | 5.2 | 20 | 17 |
|  |  |  | 2 | 250 | 12 | 5.4 | 20 | 24 |
|  |  |  | 3 | 250 | 11.5 | 5.4 | 20 | 22 |
|  |  |  | 4 | 220 | 12 | 5.7 | 20 | 18 |

Figure 12:
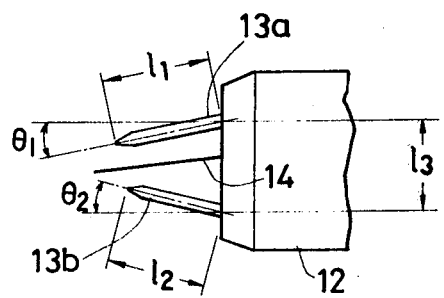
FIG. 12 is a diagrammatic illustration showing dimensions and angles of electrodes extended from a welding torch.

| | |
|---|---|
| Electrodes | Two tungsten electrodes of 2.4 mm diameter arranged as shown in Fig. 12 in which l1 is 13 mm, θ1 is 15°, l2 is 10.5 mm, θ2 is 7.5° and l3 is 10 mm. |
| Filler wire | Inconel wire of 1.2 mm diameter |
| shielding gas | Argon gas |
| Torch weaving frequency | 20 times/minute |
| Welding speed | 5.3 cm/minute |

| | |
|---|---|
| Steel plate | 9% nickel steel |
| Electrodes | Two tungsten electrodes of 2.4 mm diameter |
| Shielding gas | Argon gas |
| Filler wire | Nickel base alloy Inconel wire of 1.2 mm diameter |

As set forth in Table-2, the volume of deposited metal in the welding method of the present invention was increased to twice or more the volume deposited by the conventional welding method.

What is claimed is:

1. A method of TIG welding in which a plurality of spaced nonconsumable electrodes extending from the head of a welding torch are placed in a protective atmosphere formed by inert shielding gas emitted from the head of the welding torch which can travel along a weld line of base metal, and a filler wire is also fed into the protective atmosphere to carry out welding of the base metal, which method comprises:

projecting the plurality of nonconsumable electrodes from the head of the welding torch toward the weld line;

passing the filler wire at least once around a ring-shaped passage for giving it a permanent set, and then passing the filler wire through the space between the electrodes extending from the head of the welding torch for feeding the filler wire, the filler wire bending toward one of the electrodes due to the permanent set;

supplying welding voltage and current independently to the respective electrodes;

producing a single molten pool by melting the base metal and filler wire with arcs generated between each electrode and the base metal, and;

controlling weld penetration and fusion of the base metal chiefly with arc plasma from one of the nonconsumable electrodes and melting the filler wire chiefly with arc plasma from the remaining electrodes.

2. A method of TIG welding according to claim 1 wherein the electric current fed to the electrode which mainly controls weld penetration of the base metal is cyclically increased and decreased in a reverse pattern of that of the electric current fed to the electrode which mainly controls melting of the filler wire, and the supply speed of the filler wire is also increased and decreased in a pattern similar to the pattern of the current fed to the electrode which mainly controls melting of the filler wire.

3. A method of TIG welding according to claim 1 wherein the plurality of nonconsumable electrodes and the filler wire are linearly positioned along the weld line.

4. A method of TIG welding according to claim 1 wherein the welding torch is weaved in directions normal to the weld line during welding.

5. A method of TIG welding according to claim 1 wherein two nonconsumable electrodes are employed and are angled inwardly toward the axis of a welding torch.

6. A method of TIG welding according to claim 1 wherein three noncomsumable electrodes are employed, one electrode being chiefly used for controlling the weld penetration of the base metal, and the other two electrodes being chiefly used for melting the filler wire, the filler wire being bent toward one of said other two electrodes.

7. A method of TIG welding according to claim 1 wherein the length and angle of each of the plurality of nonconsumable electrodes from the welding torch is arbitrarily adjusted.

* * * * *

UNITED STATES PATENT AND TRADEMARK OFFICE
CERTIFICATE OF CORRECTION

PATENT NO. : 4,136,273

DATED : January 23, 1979

INVENTOR(S) : HARUO FUJITA, YASUSHI ISHIKAWA, HIROSHI TACHIKAWA and TAIZO NAKAMURA It is certified that error appears in the above-identified patent and that said Letters Patent are hereby corrected as shown below:

On cover sheet Item [75], "Eujita" should read -- Fujita --.

Signed and Sealed this

Twenty-second Day of May 1979

[SEAL]

Attest:

RUTH C. MASON
Attesting Officer

DONALD W. BANNER
Commissioner of Patents and Trademarks